(12) United States Patent
Bohm et al.

(10) Patent No.: US 7,627,708 B2
(45) Date of Patent: *Dec. 1, 2009

(54) MULTI-HOST USB DEVICE

(75) Inventors: Mark R. Bohm, Bear Creek, TX (US);
Atish Ghosh, Austin, TX (US)

(73) Assignee: Standard Microsystems Corporation,
Hauppauge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/340,957

(22) Filed: Dec. 22, 2008

(65) Prior Publication Data

US 2009/0106474 A1 Apr. 23, 2009

Related U.S. Application Data

(63) Continuation of application No. 11/425,613, filed on Jun. 21, 2006, now Pat. No. 7,523,243.

(60) Provisional application No. 60/792,178, filed on Apr. 14, 2006.

(51) Int. Cl.
*G06F 13/00* (2006.01)
*G06F 13/14* (2006.01)
*G06F 13/36* (2006.01)

(52) U.S. Cl. .................. 710/305; 710/104; 710/110; 710/309

(58) Field of Classification Search ............... 710/104, 710/110, 305, 309
See application file for complete search history.

(56) References Cited

U.S. PATENT DOCUMENTS 5,784,581 A 7/1998 Hannah (Continued)

FOREIGN PATENT DOCUMENTS

CA 2298783 9/2000

(Continued)

OTHER PUBLICATIONS

Belkin, "4×4 USB Peripheral Switch Review", Feb. 25, 2004, retrieved from Internet: http://www.everythingusb.com/hardware/index/Belkin_USB_Peripheral_Switch.htm, 4 pages.

(Continued)

*Primary Examiner*—Mark Rinehart
*Assistant Examiner*—Jeremy S Cerullo
(74) *Attorney, Agent, or Firm*—Meyertons Hood Kivlin Kowert & Goetzel, P.C.; Jeffrey C. Hood

(57) ABSTRACT

A USB device may be simultaneously configured and accessed by two or more USB hosts. The USB device may include separate upstream ports and buffers for each host, and a multi-host capable device controller configured to respond to simultaneous USB requests received from more than one host. The USB device may maintain a dedicated address, configuration, and response information for each host. The USB device may include a shared USB function block, and a multi-host controller configured to establish concurrent respective USB connections between the shared USB function block and two or more USB hosts, to allow the two or more USB hosts to simultaneously configure the USB device for the shared USB function. The multi-host controller may be configured to receive and respond to simultaneous respective USB access requests for the shared USB function sent by the two or more USB hosts.

25 Claims, 2 Drawing Sheets

U.S. PATENT DOCUMENTS

| | | | |
|---|---|---|---|
| 5,815,167 A | 9/1998 | Muthal et al. | |
| 5,890,015 A | 3/1999 | Garney et al. | |
| 5,953,511 A | 9/1999 | Sescila, III et al. | |
| 5,978,389 A | 11/1999 | Chen | |
| 6,119,196 A | 9/2000 | Muller et al. | |
| 6,141,719 A | 10/2000 | Rafferty et al. | |
| 6,145,045 A | 11/2000 | Falik et al. | |
| 6,185,641 B1 | 2/2001 | Dunnihoo | |
| 6,205,501 B1 | 3/2001 | Brief et al. | |
| 6,279,060 B1 | 8/2001 | Luke et al. | |
| 6,304,995 B1 | 10/2001 | Smith et al. | |
| 6,308,239 B1 | 10/2001 | Osakada et al. | |
| 6,324,605 B1 | 11/2001 | Rafferty et al. | |
| 6,435,904 B1 | 8/2002 | Herbst et al. | |
| 6,480,927 B1 | 11/2002 | Bauman | |
| 6,505,267 B2 | 1/2003 | Luke et al. | |
| 6,516,205 B1 | 2/2003 | Oguma | |
| 6,532,512 B1 | 3/2003 | Torii et al. | |
| 6,546,450 B1 | 4/2003 | Liu | |
| 6,564,275 B1 | 5/2003 | Chen | |
| 6,600,739 B1 | 7/2003 | Evans et al. | |
| 6,601,146 B2 | 7/2003 | Auslander et al. | |
| 6,618,776 B1 | 9/2003 | Zimmermann et al. | |
| 6,622,195 B2 | 9/2003 | Osakada et al. | |
| 6,671,765 B1 | 12/2003 | Karlsson et al. | |
| 6,678,760 B2 | 1/2004 | Brief | |
| 6,725,302 B1 | 4/2004 | Benayoun et al. | |
| 6,732,218 B2 | 5/2004 | Overtoom et al. | |
| 6,775,733 B2 | 8/2004 | Chang et al. | |
| 6,816,929 B2 | 11/2004 | Ueda | |
| 6,850,998 B2 * | 2/2005 | Inoue et al. | 710/38 |
| 6,901,471 B2 | 5/2005 | Govindaraman | |
| 6,959,355 B2 | 10/2005 | Szabelski | |
| 6,973,078 B2 | 12/2005 | Ma | |
| 6,993,620 B2 | 1/2006 | Ferguson | |
| 7,024,501 B1 | 4/2006 | Wright | |
| 7,028,114 B1 | 4/2006 | Milan et al. | |
| 7,028,133 B1 | 4/2006 | Jackson | |
| 7,185,126 B2 | 2/2007 | Szabelski | |
| 7,246,189 B2 * | 7/2007 | Ulenas | 710/305 |
| 7,523,243 B2 * | 4/2009 | Bohm et al. | 710/305 |
| 2004/0153597 A1 | 8/2004 | Kanai et al. | |
| 2005/0005045 A1 * | 1/2005 | Kim et al. | 710/74 |
| 2005/0060490 A1 * | 3/2005 | Lu | 711/115 |
| 2005/0060636 A1 | 3/2005 | Mathe | |
| 2005/0216620 A1 | 9/2005 | Sandulescu et al. | |
| 2006/0020737 A1 | 1/2006 | Szabelski | |
| 2006/0056401 A1 | 3/2006 | Bohm et al. | |
| 2006/0059293 A1 | 3/2006 | Wurzburg et al. | |

FOREIGN PATENT DOCUMENTS

| | | |
|---|---|---|
| EP | 0 982 663 A2 | 3/2000 |
| GB | 2352540 | 1/2001 |
| JP | 2000242377 | 9/2000 |
| JP | 2001043178 | 2/2001 |
| JP | 2001229119 | 8/2001 |
| JP | 2003195991 | 7/2003 |
| KR | 1020040008365 A | 1/2004 |
| KR | 100490068 B1 | 5/2005 |
| WO | WO 2006031776 | 3/2006 |

OTHER PUBLICATIONS

Australian Patent Office Written Opinion for application No. SG 200702711-3, mailed May 21, 2008.

Human translation of JP 2001229119A Publication, "Device Selection Hubbox by Plural Computers" obtained on Jun. 23, 2008 (12 pages).

Programming Multi-Host Device Sharing USB Hub; Research Disclosure, IBM Corp.; Feb. 1, 1999; Mason Publications; Hampshire, GB.

"On-The-Go Supplement to the USB 2.0 Specification—Revision 1.0"; Dec. 18, 2001.

Cypress Semiconductor Corporation, "TetraHubTM High-speed USB Hub Controller," Publication No. CY7C6540, Dec. 5, 2002, 25 pages.

"USB Hub in a Nutshell"; Beyond Logic; Jun. 15, 2005 (Copyright 2001-2005); 5 Pages, Chapter 1.

Fred Zlotnick; "NLAS4717 Analog Switch Permits USB 1.1 Switching"; on Semiconductor; May 2004; 4 pages.

"FSUSB11 Low Power High Bandwidth USB Switch Dual SPDT Multiplexer/Demultiplexer"; Fairchild Semiconductor; Apr. 2004 (revised Jul. 2004); 7 pages.

"FSUSB11 Low Power Full Speed USB (12 Mbps) Switch"; Fairchild Semiconductor; Apr. 2004 (revised Jul. 2005); 9 pages.

"USB 1.1 Switch Offers Low Power and Bandwidth"; Electronic Design; Jul./Aug. 2004; 3 pages.

"Universal Serial Bus Specification Revision 2.0", Compaq Computer Corporation, Hewlett-Packard Company, Intel Corporation, Lucent Technologies Inc., Microsoft Corporation, NEC Corporation, Koninklijke Philips Electroncs N. V., Apr. 27, 2000, 650 pages.

USB2524 USB MultiSwitch Hub, http://www.smsc.com/main/catalog/usb2524.html, accessed Nov. 26, 2007 (4 pages).

"MSC Introduces Industry's First USB Sharing Hub," networking news, http://home.nestor.minsk.by/networks/news/2006/04/1706.html, accessed Nov. 26, 2007 (2 pages).

Miller, Matthew, "USB hub chip accepts hospitality of two hosts" http://www.edn.com/index.asp?layout=article&articleid=CA6325520&industryid=2573, Apr. 17, 2006, accessed Nov. 26, 2007 (5 pages).

"USB hub" from Wikipedia, the free encyclopedia (http://en.wikipedia.org?wiki/USB_hub); 2 pages.

"USB2.0 Compatible 4-Port Switching Hub with Two Upstream Host Ports"; SMSC Datasheet; Nov. 8, 2005; 26 pages; Standard Microsystems Corp.; Hauppauge, NY.

Computer-generated translation of JP2001229119A Publication, "Device Selection Hubbox by Plural Computers", by Hitachi Ltd., published Aug. 24, 2001, 21 pages.

Human-generated translation of JP20011229119A Publication, "Device Selection Hubbox by Plural Computers", by Hitachi Ltd., published Aug. 24, 2001, 2 pages.

Korean Office Action for Application 10-2007-7005961, entitled "Universal Serial Bus Switching Hub," dated Apr. 18, 2008, 5 pages.

* cited by examiner

MULTI-HOST USB DEVICE

PRIORITY CLAIM

This application is a continuation of U.S. patent application Ser. No. 11/425,613 titled "Multi-Host USB Device Controller" filed Jun. 21, 2006, now U.S. Pat. No. 7,523,243 whose inventors are Mark R. Bohm and Atish Ghosh, which claims benefit of priority of provisional application Ser. No. 60/792,178 titled "Multi-Host USB Device Controller", filed on Apr. 14, 2006, whose inventors are Mark. R Bohm and Atish Ghosh, and which are all hereby incorporated by reference in their entirety as though fully and completely set forth herein.

BACKGROUND OF THE INVENTION

1. Field of the Invention

The present invention relates generally to computer hardware and, more specifically, to Universal Serial Bus (USB) controllers.

2. Description of the Related Art

The Universal Serial Bus (USB) allows coupling of peripheral devices to a computer system. USB is a serial cable bus for data exchange between a host computer and a wide range of simultaneously accessible devices. The bus allows peripherals to be attached, configured, used, and detached while the host is in operation. For example, USB printers, scanners, digital cameras, storage devices, card readers, etc. may communicate with a host computer system over USB. USB based systems may require that a USB host controller be present in the host system, and that the operating system (OS) of the host system support USB and USB Mass Storage Class Devices.

USB devices may communicate over the USB bus at low-speed (LS), full-speed (FS), or high-speed (HS). A connection between the USB device and the host may be established via digital interconnect such as Interchip USB, ULPI, UTMI, etc., or via a four wire interface that includes a power line, a ground line, and a pair of data lines D+ and D−. When a USB device connects to the host, the USB device may first pull a D+ line high—or the D− line if the device is a low speed device—using a pull up resistor on the D+ line. The host may respond by resetting the USB device. If the USB device is a high-speed USB device, the USB device may "chirp" by driving the D− line high during the reset. The host may respond to the "chirp" by alternately driving the D+ and D− lines high. The USB device may then electronically remove the pull up resistor and continue communicating at high speed. When disconnecting, full-speed devices may remove the pull up resistor from the D+ line (i.e., "tri-state" the line), while high-speed USB devices may tri-state both the D+ and D− lines.

A USB hub may be coupled to a USB host controller to allow multiple USB devices to be coupled to the host system through the USB host controller. In addition, other USB hubs may be coupled to the USB hub to provide additional USB device connections to the USB host controller. In general, the USB specification is structured so that every device is configured and accessed by a single host controller. Consumers typically desire maximum flexibility, and may want to have a simple means by which to cheaply share devices. There are several switching devices that currently allow a device to be switched between multiple USB Host controllers, but the device can generally be configured and accessed by only a single host at any given time. There also exist stand-alone USB switches that provide the capability of switching a device between upstream USB Host Controllers. These solutions, however, fail to permit simultaneous access to the USB device that is downstream of the hub or switch. The USB device is typically accessed by one single host at a time, and when access to the USB device is switched, the device must be re-configured, thereby losing internal state information.

Other corresponding issues related to the prior art will become apparent to one skilled in the art after comparing such prior art with the present invention as described herein.

SUMMARY OF THE INVENTION

In one set of embodiments, a single USB device may be shared across multiple USB hosts without needing to be re-configured or re-enumerated each and every time the upstream hosts alternate accessing the USB device. Since each host has simultaneously enumerated the device, there may be no need to detach and reconfigure the device on the fly. Multiple USB hosts may simultaneously share a single device/function, for example a Gigabit Ethernet controller. While in most present day implementations each host that is configured to have Ethernet access is implemented with its own Ethernet controller and Ethernet switch, in various embodiments of the present invention the Ethernet switch may be replaced by a less expensive and more compact multi-host USB controller, allowing each host to access the USB device directly. In another set of embodiments, storage media devices may be configured with a multi-host USB controller to provide a USB based Network Attached Storage (NAS) device that can handle storage requests from multiple USB hosts.

In various embodiments, by using a multi-host capable device controller, a shared USB device may be simultaneously configured and accessed by two or more USB hosts. The multi-host capable device may include separate buffers for each host, and may be configured with the capability to respond to USB requests from more than one host. The device may maintain a dedicated address, configuration and response information for each host. Each host may therefore establish a dedicated USB connection with the sharing device.

A USB device may be divided into three segments or blocks. The first block may comprise a USB interface that includes the physical (PHY) or digital link, USB Link layer (SIE), and other circuitry necessary to send and/or receive data over the USB. The second block may comprise an Endpoint Buffer Block, which may include the endpoint buffers that are used by the first and third blocks to buffer data and control reads and writes to/from the USB—transferred through the first block—and/or the Peripheral Function—transferred through the third block. The third block may comprise the "Peripheral Function" itself, which may include the circuitry necessary for the specific USB device function, for example an Ethernet Controller, printer, Video Camera, etc.

In one set of embodiments, the first block may be replicated for each upstream host port, and some, or all, of the second block may be replicated for each upstream host port as well. In each case, the extent to which blocks and/or portions of the blocks are replicated may vary based on USB device type. The third block may correspond to the USB device that will be shared by multiple USB hosts, and may therefore not need to be duplicated. A fourth block may be added—typically between the first and second blocks, or as part of either the second or third blocks—configured as an arbitration block. The internal arbitration mechanism may enable each host to access the shared Peripheral Function by either interleaving host accesses, or by using a common request/grant structure, which may hold-off one host while another host completes a data transfer to/from the shared device. The selection of the specific mechanism used may be determined according to the specific USB device type that is being shared.

In some embodiments, the bandwidth from the shared peripheral function to each host may be reduced in order to allow each host equal access. In other embodiments, the bandwidth may not be reduced because the bandwidth of the Peripheral Function may exceed the bandwidth of the host. Other aspects of the present invention will become apparent with reference to the drawings and detailed description of the drawings that follow.

BRIEF DESCRIPTION OF THE DRAWINGS

A better understanding of the present invention may be obtained when the following detailed description is considered in conjunction with the following drawings, in which.

Figure 1:
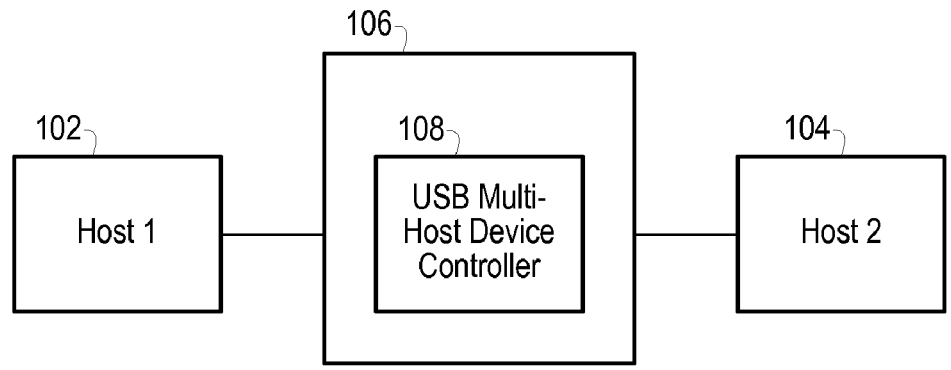
FIG. 1 shows a system diagram of a multi-host capable USB device coupled to multiple hosts according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (e.g., having the potential to or being able to in some embodiments), not a mandatory sense (i.e., must). The term "include", and derivations thereof, mean "including, but not limited to". The term "coupled" means "directly or indirectly connected".

DETAILED DESCRIPTION OF THE PREFERRED EMBODIMENTS

Figure 2:
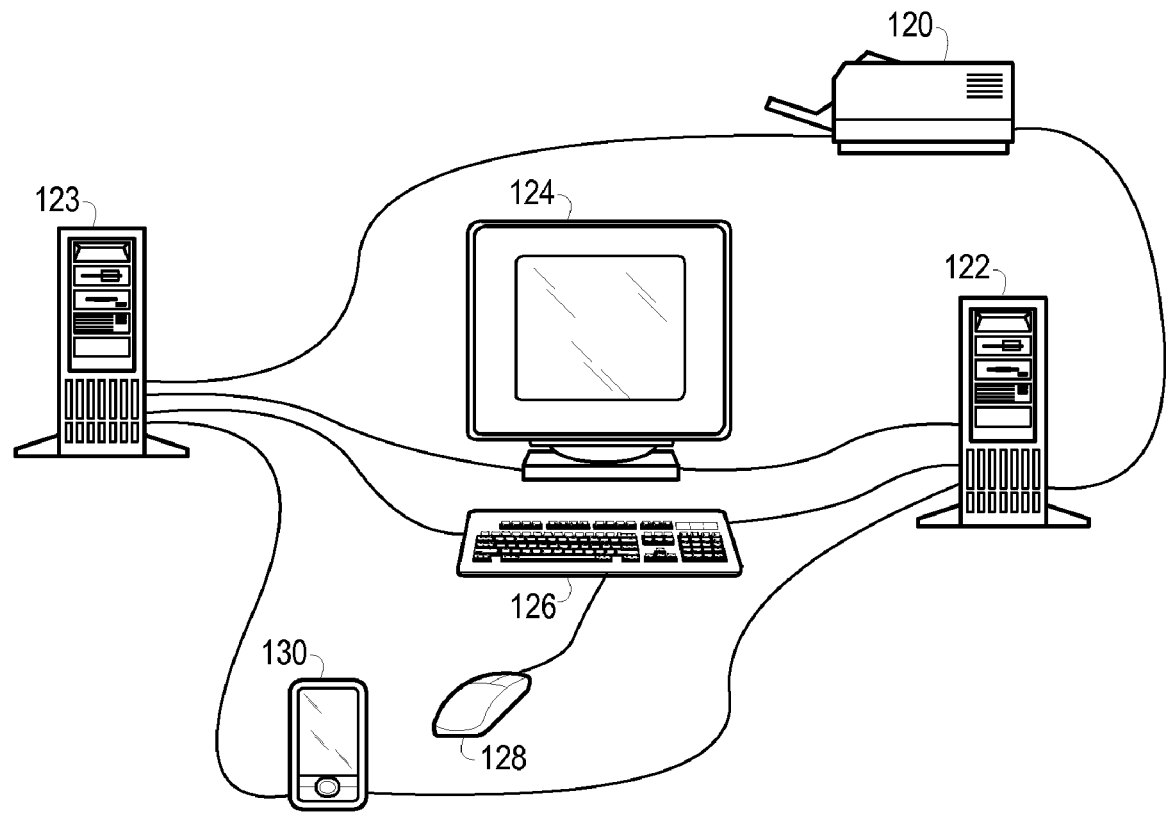
FIG. 2 shows multi-host capable devices coupling to multiple hosts according to one embodiment.

In one set of embodiments, a multi-host USB device may provide maximum flexibility and a simple means by which to cheaply share devices with multiple hosts, by providing a separate configuration and access interface for each upstream host. FIG. 1 illustrates a block diagram of a multi-host device 106 configured with a USB multi-host device controller 108, with multi-host device 106 coupled to first host 102 and second host 104, which may both establish control with multi-host device 106. As shown in FIG. 2, by way of examples, multi-host device 106—configured with USB multi-host device controller 108—may be a personal digital assistant (PDA) 130, a keyboard 126, and/or a printer 120 shared by personal computer (PC) 122 and PC 123. Many other devices may be similarly configured as multi-host devices that include a multi-host device controller 108, and the number and type of such devices is not limited to those show in FIG. 2.

Figure 3:
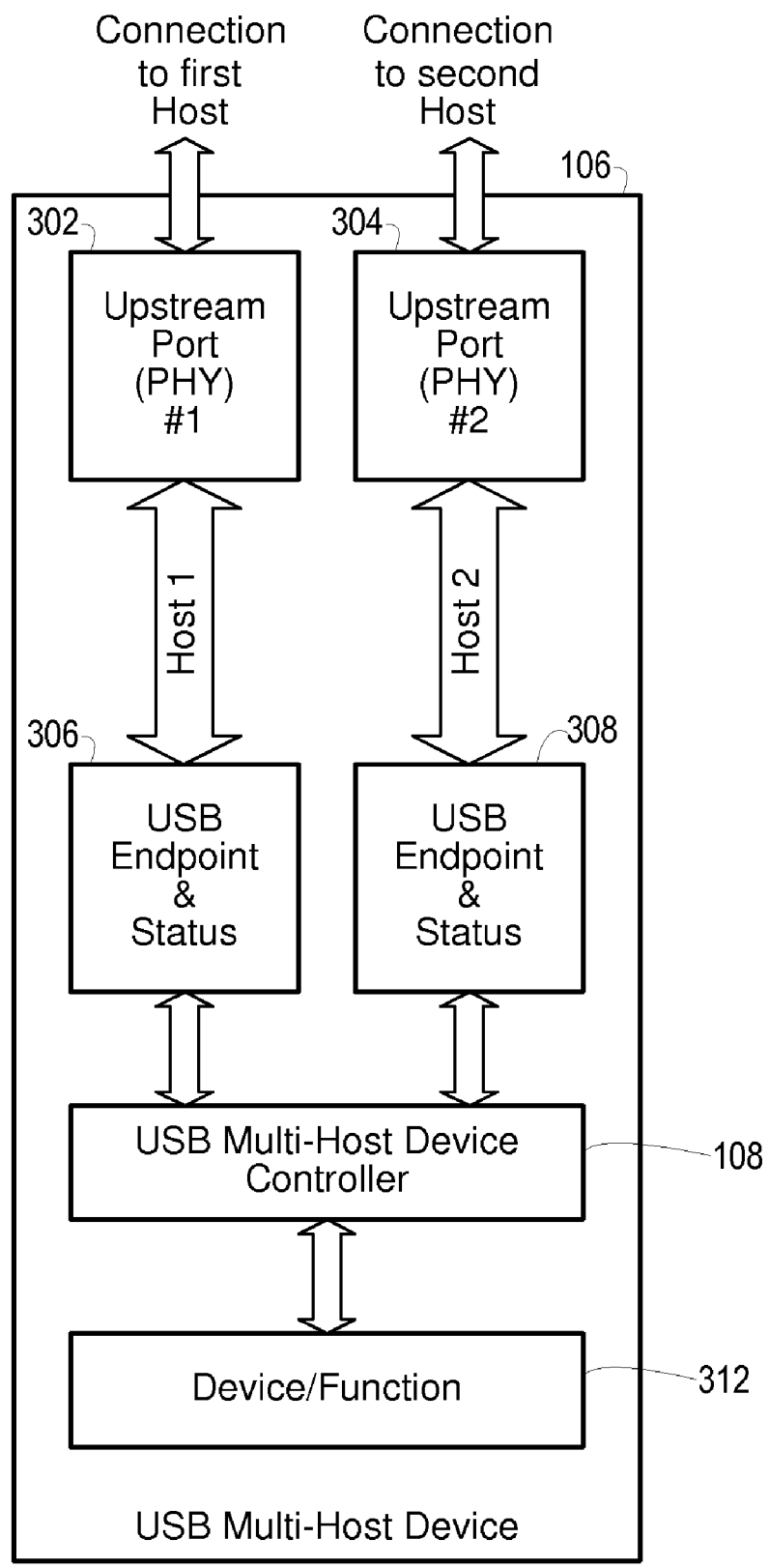
FIG. 3 shows a logic diagram of a USB multi-host device according to one embodiment.

In one embodiment of multi-host (or USB sharing) device 106, shown in FIG. 3, an upstream port or PHY is configured for each host to be connected. In this case upstream port 302 is configured to interface/couple to the first host (for example first host 102 shown in FIG. 1), and upstream port 304 is configured to interface/couple to the second host (for example second host 104 shown in FIG. 1). Multi-host device 106 may be addressed separately by each host, and may respond to each host within USB specified limits. Multi-host device controller 108 may internally determine which host request to fully service immediately, and may either send not-ready packets in a USB specific manner to the other host, or may interleave the host requests. Peripheral Device/Function 312—which may comprise the main consumer component, such as a Ethernet Controller, Mass-Storage drive, etc.—may not be aware of the multi-host capability of the USB component, and may be a standard off-the-shelf item.

Multi-host device 106 may also be configured with Endpoint and status buffers 306 and 308, coupling USB multi-host device controller 108 to PHY 302 and PHY 304, respectively. Endpoint buffers 306 and 308 may be used by upstream ports 302 and 304, and USB multi-host device controller 108 to buffer data and control reads and writes to/from each respective host corresponding to PHY 302 and PHY 304, and/or peripheral device/function 312 coupled to USB multi-host device controller 108.

In one set of embodiments, USB multi-host device controller 108 may be configured with an internal arbitration mechanism that may permit each host—first host 102 and second host 104, for example—to access shared peripheral function 312 by either interleaving host accesses, or by using a common request/grant structure that may hold-off one host while another host completes a data transfer to/from shared device/function 312. The selection of the specific mechanism used may be configured according to the specific USB device type that is being shared. In one set of embodiments, the bandwidth from shared peripheral device/function 312 to each host may be reduced in order to allow each host equal access. In other embodiments, the bandwidth may not be reduced if the bandwidth of the peripheral function exceeds the bandwidth of the host.

It should be noted that while FIG. 3 shows 2 upstream ports coupling to two hosts, alternate embodiments may be configured with more than two upstream ports, (and correspondingly with possibly more than two endpoint and status buffers), and while those embodiments are not shown, they are possible and are contemplated. For example, a multi-host device (e.g. a keyboard) may be configured with a multi-host device controller to couple to three or four hosts, and so forth.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A USB multi-host device comprising:
   first and second upstream ports configured to couple to corresponding first and second hosts;
   a USB function block; and
   a multi-host device controller coupling the USB function block to the first and second upstream ports, wherein the multi-host device controller is configured to establish concurrent respective USB connections between the USB function block and the first and second upstream ports, to allow the corresponding first and second hosts to:
   simultaneously enumerate and configure the USB multi-host device;

simultaneously access the USB multi-host device; and
alternately access the USB function block without reconfiguring and/or re-enumerating the USB multi-host device before each access.

2. The USB multi-host device of claim 1, further comprising a first endpoint buffer coupled between the first upstream port and the multi-host device controller, and a second endpoint buffer coupled between the second upstream port and the multi-host device controller.

3. A USB multi-host device comprising:
a USB function block; and
a multi-host device controller coupling the USB function block to a first host and a second host, wherein the multi-host device controller is configured to establish a first USB connection between the first host and the USB function block and a second USB connection between the second host and the USB function block, wherein the first USB connection and the second USB connection are concurrent, to allow the first host and the second host to:
simultaneously access the USB multi-host device; and
alternately access the USB function block, without either one of the first and second hosts reconfiguring the USB multi-host device each time a different one of the first host and the second host is given access to the USB function block.

4. The USB multi-host device of claim 3, wherein the multi-host USB device is not re-enumerated by either the first host or the second host each time the first host and the second host alternate accessing the USB function block.

5. The USB multi-host device of claim 3, further comprising a first upstream port coupled between the first host and the multi-host device controller, and a second upstream port coupled between the second host and the multi-host device controller.

6. The USB multi-host device of claim 5, further comprising a first endpoint buffer coupled between first upstream port and the multi-host device controller, and a second endpoint buffer coupled between the second upstream port and the multi-host device controller.

7. A USB device comprising:
a USB function block; and
a multi-host device controller configured to couple the USB function block to a plurality of hosts, wherein the multi-host device controller is operable to establish concurrent respective USB connections between the USB function block and the plurality of hosts, to allow the plurality of hosts to:
simultaneously enumerate and configure the USB device;
simultaneously access the USB device; and
alternately access the USB function block, without any of the plurality of hosts reconfiguring the USB device each time a different one of the plurality of hosts is given access to the USB function block.

8. The USB device of claim 7, wherein the multi-host device controller is operable to simultaneously receive respective host requests from the plurality of hosts, wherein the multi-host device controller is operable to internally determine which of the respective host requests to service immediately.

9. The USB device of claim 8, wherein the multi-host device controller is operable to interleave the respective host requests.

10. The USB device of claim 8, wherein the multi-host device controller is operable to send not-ready packets in a USB specific manner to hosts whose request was not immediately serviced.

11. The USB device of claim 7, wherein the multi-host device controller comprises an internal arbitration mechanism configured to permit the plurality of hosts to simultaneously request access to the USB function block by interleaving host access requests and/or by using a common request/grant structure;
wherein the common request/grant structure comprises one of the plurality of hosts being granted access to the USB function block while remaining ones of the plurality of hosts are not considered for access to the USB function block until the one of the plurality of hosts has completed accessing the USB function block.

12. The USB device of claim 11, wherein the arbitration mechanism is configured according to a specific USB device type comprised in the USB function block.

13. The USB device of claim 7, wherein a bandwidth from the USB function block to each respective one of the plurality of hosts is reduced to allow each respective one of the plurality of hosts equal access to the USB function block.

14. The USB device of claim 13, wherein the bandwidth is not reduced if it exceeds a bandwidth of the respective one of the plurality of hosts.

15. The USB device of claim 7, further comprising a respective upstream port coupled between the multi-host device controller and each of the plurality of hosts.

16. The USB device of claim 15, further comprising a respective buffer coupled between each respective upstream port and the multi-host device controller.

17. The USB device of claim 7, wherein the multi-host device controller is configured to maintain respective dedicated address, configuration, and response information for each of the plurality of hosts.

18. A method for sharing a USB device between multiple hosts, the method comprising:
establishing concurrent respective USB connections between a plurality of hosts and a shared USB function comprised in the USB device;
two or more of the multiple hosts simultaneously enumerating and configuring the USB device;
receiving respective access requests to the shared USB function from the two or more of the plurality of hosts; and
processing the respective access requests, to allow the two or more of the plurality of hosts to alternately access the shared USB function without any of the two or more of the plurality of hosts reconfiguring the USB device each time the USB function is accessed in response to a respective access request from a different one of the two or more of the plurality of hosts.

19. The method of claim 18, wherein said processing comprises determining which of the respective access requests to service immediately, and servicing that respective access request.

20. The method of claim 19, wherein said processing comprises holding off access to the shared USB function by those respective access requests that are not immediately serviced, until the shared USB function is no longer accessed by a given one of the two or more of the plurality of hosts from which the serviced respective access request was received.

21. The method of claim 18, wherein said processing comprises interleaving accesses requested by the respective access requests to the shared USB function.

22. The method of claim 18, further comprising maintaining respective dedicated address, configuration, and response information for each of the plurality of hosts.

23. A USB device comprising:
- a shared USB function block; and
- a controller configured to establish concurrent respective USB connections between the shared USB function block and two or more USB hosts, to allow the two or more USB hosts to simultaneously configure the USB device for the shared USB function;
- wherein the controller is configured to receive and respond to simultaneous respective USB access requests sent by the two or more USB hosts for accessing the shared USB function.

24. The USB device of claim 23, wherein in establishing the concurrent respective USB connections between the shared USB function block and the two or more USB hosts, the controller is operable to maintain respective dedicated address, configuration and response information for each of the two or more USB hosts.

25. The USB device of claim 23, wherein the controller comprises:
- a respective USB interface circuit for each of the two or more USB hosts, wherein each respective USB interface circuit enables the USB device to transmit and/or receive data over a USB bus; and
- a respective endpoint buffer for each of the two or more USB hosts for storing respective dedicated address, configuration and response information for each of the two or more USB hosts.

\* \* \* \* \*